Nov. 7, 1944.   J. H. JACOBS   2,362,275
POSITIVE CROSS FEED STOP ASSEMBLY ATTACHMENT FOR TURNING LATHES
Filed May 13, 1942
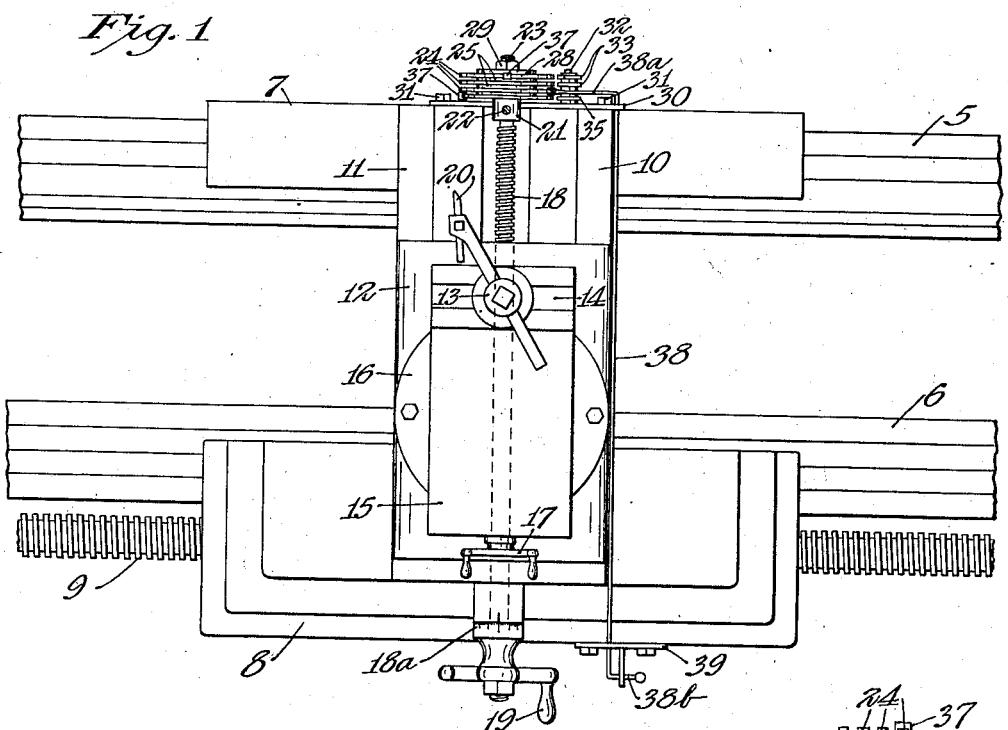
Inventor
Joseph H. Jacobs
By Williamson + Williamson
Attorneys Patented Nov. 7, 1944

2,362,275

UNITED STATES PATENT OFFICE 2,362,275

POSITIVE CROSS-FEED STOP ASSEMBLY ATTACHMENT FOR TURNING LATHES

Joseph H Jacobs, Minneapolis, Minn.

Application May 13, 1942, Serial No. 442,740

1 Claim. (Cl. 82—24)

This invention relates to a positive cross feed stop assembly attachment for turning lathes.

Ordinarily in turning shafts, etc., in duplication and certain specified diameters, the operator turns the cross screw handle, moving the lathe tool bit into the work to the required diameter and notes the reading on the dial placed there for this purpose. For each separate cut made, the dial reading must be noted so that the succeeding operation may be duplicated. However, it is very difficult, especially for an unskilled operator, to check these dial figures accurately, which results in varied diameters and inaccurate work. But with my positive stop, pre-set exactly on any dial graduation desired, all variation is eliminated and the resultant work is uniform for the same cut made on each succeeding piece.

Furthermore, when setting of the dial of the feeding mechanism cannot be accurately duplicated after the lathe mechanism has become the least bit worn because of the lost motion, it is extremely difficult, if not impossible, to make a number of duplicate parts within the small tolerances required for precision machine work. Even a skilled operator must then check and recheck with micrometers on each piece of work cut in the lathe.

Also in thread cutting, in which several cuts are generally taken the operator normally must check with the dial to determine the depth of each succeeding cut, but when my stop assembly is used, he disregards the dial and turns the handle until it is checked by the pre-selected stop, adjusted to the correct depth for each successive cut, the final one being the finish cut and stopped at exactly the correct depth.

An object of the invention is to provide the cross feed screw of a turning lathe with easily adjusted movable stops permitting the operator to readily and accurately duplicate turning operations when machining small or large quantities of similar parts.

Another object of the invention is to provide a multiplicity of feed screw stops so arranged that the operator can quickly and easily select different stops for different cuts.

A further object of the invention is to provide lathe mechanism having a feed screw with an operating handle at one end and with my improved adjustable stop mechanism at the other end of the screw where it does not interfere with the normal operation of the lathe in combination with stop selective means located conveniently adjacent the actuating handle of the feed screw so that it is always availabe to the operator of the machine.

These and other objects and advantages of the invention will more fully appear from the following description made in connection with the accompanying drawing, wherein like reference characters refer to the same parts throughout the views, and, in which:

Fig. 1 is a fragmentary plan view of a conventional lathe with my invention thereon;

Fig. 2 is an enlarged fragmentary view partially in section showing one end of the feed screw with my stop mechanism mounted thereon;

Fig. 3 is a fragmentary elevation of a portion of the stop control mechanism; and Fig. 4 is a rear elevation of the stop mechanism.

In Fig. 1 there are shown portions of a lathe including longitudinal bed members 5 and 6. Mounted on the bed members 5 and 6 are longitudinally slidable blocks 7 and 8. A longitudinal feed screw 9 is threaded through the block 8 and suitably journaled at its ends so that when said screw 9 is rotated the block 8 will be moved longitudinally of the bed rail 6. The details of the longitudinal feed screw 9 and blocks 7 and 8 are not shown since they are conventional.

Extending between the longitudinal slidable blocks 7 and 8 are transverse bed members 10 and 11 and upon the transverse bed members a transversely slidable block 12 is supported. The transverse block 12 in turn supports a tool post 13 which is slidably mounted in a guide 14 which is formed in a plate 15 supported by a suitable turn table 16 in the conventional manner. A locking screw for the turn table 16 and plate 15 is generally indicated at 17.

A transverse feed screw 18 is suitably supported by the transverse bed members 10 and 11 and said feed screw 18 is threaded through the transversely slidable block 12 so that when said transverse feed screw is rotated by the hand wheel 19 the transverse block 12 will move across the longitudinal bed members 5 and 6. This, of course, moves the tool post 13 and a tool 20 supported thereby.

At one end of the feed screw 18 adjacent the hand wheel 19 is a dial 18a which was referred to in the first part of the specification and which is conveniently provided to supposedly permit the operator to check the depth of succeeding duplicate cuts. As has been pointed out, however, it is difficult for an unskilled operator to accurately set the dial 18a, and should the lathe mechanism become a little worn the play between the various moving parts involving the feeding operation makes it impossible to exactly duplicate the cuts since there are slight variations even though the dial reading may be indicated the same in each operation. The mechanism described herebelow which constitutes my invention is designed to eliminate the need for such a dial as the dial 18a as well as to eliminate inaccuracy arising from wear in the lathe tool feeding mechanism.

Mounted on the opposite end of the transverse feed screw 18 remote from the hand wheel 19 is a collar 21 secured to the end of shaft 18 by a set screw 22. The collar 21 forms a portion of a short shaft 23 upon which is positioned a plurality of discs 24 separated by spacers 25. The spacers 25 are held on the shaft 23 against rotation by means of a key 26 having a lug 27 for each of the spacer discs 25. An outer disc or washer 28 is fitted against the outer face of the right-hand disc, as viewed in Fig. 3, and a nut 29 is threaded on the outer end of the bolt 23 to clamp the discs and spacers together. A plate 30 is clamped to the longitudinal slidable block 7 by means of bolts 31 and said plate 30 serves to support the collar 21 forming a portion of the short shaft or bolt 23.

It will also be noted that the key 26 engages the left-hand disc 24, as viewed in Fig. 2. This disc cannot be rotated relative to the shaft 18 whereas the three remaining discs can be rotated when the nut 29 is loosened.

The plate 30 at its left-hand side, as viewed in Fig. 4, has a pivot pin 32 extending outwardly therefrom, said pin carrying a plurality of stop elements 33 which have flat ends 34 and one stop element 35 having a hook-like end 36. Each of the discs 24 carries an abutment member 37 which extends out radially from the edge of each disc. When the transverse feed screw 18 is rotated in a counterclockwise direction, as viewed in Fig. 4, and one of the stop elements 33 is swung to bring its end 34 into the path of movement of its respective abutment member 37 the screw will be stopped when the abutment member engages the stop.

The left-hand disc 24, as stated above, is keyed to the short shaft or bolt 23 and its abutment member 37 is positioned so that the dial 18a is at a zero reading when said abutment member on the left-hand disc 24 is in engagement with its respective stop 33. This facilitates the setting of other abutment members on their respective discs.

When the transverse feed screw 18 is rotated in a clockwise direction, as viewed in Fig. 4, the stop element 35 with its hooked end 36 will engage its respective abutment member 37, and, of course, said stop element 35 can also be swung in to intercept its abutment member 37 when the feed screw 18 is rotated in a counterclockwise direction. This is useful in boring and facing operations in which the tool for the boring operation may be returned quickly to exactly its former position after the first cut. Only one such reverse movement stop is shown, but, of course, more may be used if desired.

It should be noted that the discs 24 supporting the abutments 37 and the stop elements 33 and 35 are located at the remote end of the feed screw 18 from the normal position of the operator of the lathe. In order that the operator will not have to reach across the machine to set the particular stop element desired I provide a rod 38 supported at its near end by a bracket 39 and at its far end by the plate 30 through which said rod 38 extends. The remote end of the rod 38 is bent at right-angles and terminates adjacent the pivoted locking elements 33 and 35 which normally lie in a vertical position and their weighted lower ends swing them away from out of the path of movement of the abutments 37 on the discs 27. The angularly bent end 38a on the rod 38 can be swung to engage any one of the stop elements 33 or 35, said rod 38 being longitudinally slidable so that the bent end 38a can be lined up with any stop as desired. The opposite or near end of rod 38 is bent at an angle to form a handle 38b and said handle 38b extends through a slot 40 in the bracket 39, said slot at one side thereof having a series of notches 41 into which the rod handle portion 38 can be inserted by twisting rod 38 and when so inserted in one of the notches 41 the remote bent end 38a of the rod 38 is in engagement with one of the stop elements 33 or 35 and holds said stop element in the path of movement of its respective stop 37.

In order to adjust the discs 24 which carry the abutment members 37 the nut 29 on the short shaft or bolt 23 is loosened and any one of the discs 24 can then be rotated relative to the feed screw 18. Any one disc 24 can be adjusted in position without disturbing the others for the reason that the spreader discs 25 are keyed and rotation of one disc cannot simultaneously rotate spreader plates adjacent thereto. The nut is then tightened and the four discs 24 are clamped securely against movement.

From the foregoing description it will be seen that I have provided a relatively simple yet highly efficient and easily operated gauge device for lathes which will insure stopping of the feed screw at the desired pre-determined point to positively and accurately govern the extent of cut. It is a device which can be relatively easily attached to existing lathes and also incorporated in the design of new ones, and does not in any way interfere with the normal operation of the lathe. While it is intended to facilitate lathe operation by less skilled workmen it is, of course, a feature which not only makes the work of a skilled lathe operator easier but it also increases the speed of operation.

It will, of course, be understood that various changes may be made in the form, details, arrangement and proportions of the various parts without departing from the scope of my invention.

What is claimed is:

In a lathe, a longitudinal bed, a longitudinally slidable block on said bed, a transversely slidable block supported by said longitudinal block for sliding movement transversely of said bed, a tool holder on said transversely slidable block, a feed screw extending transversely of said longitudinal bed and having threaded engagement with said transversely slidable block, a plurality of abutment members secured to and extending laterally from said transverse feed screw, stop means movable into and out of the path of movement of said abutment members, said abutment members being located at one end of said feed screw, feed screw actuating means at the other end of said screw, and means extending from adjacent said feed screw actuating means transversely of said longitudinal bed to said stop means for selectively shifting said stop means into the path of movement of said abutment members.

JOSEPH H. JACOBS.